United States Patent Office 2,777,990
Patented Jan. 15, 1957

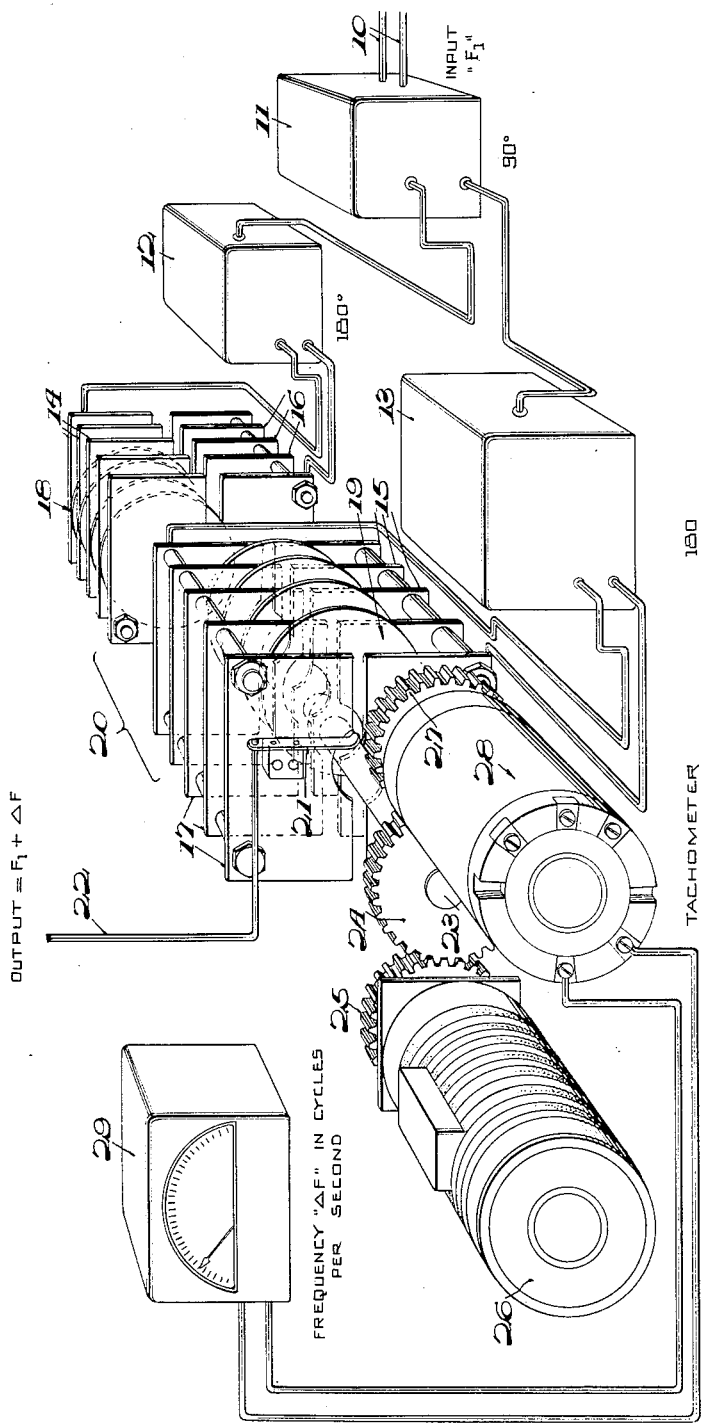

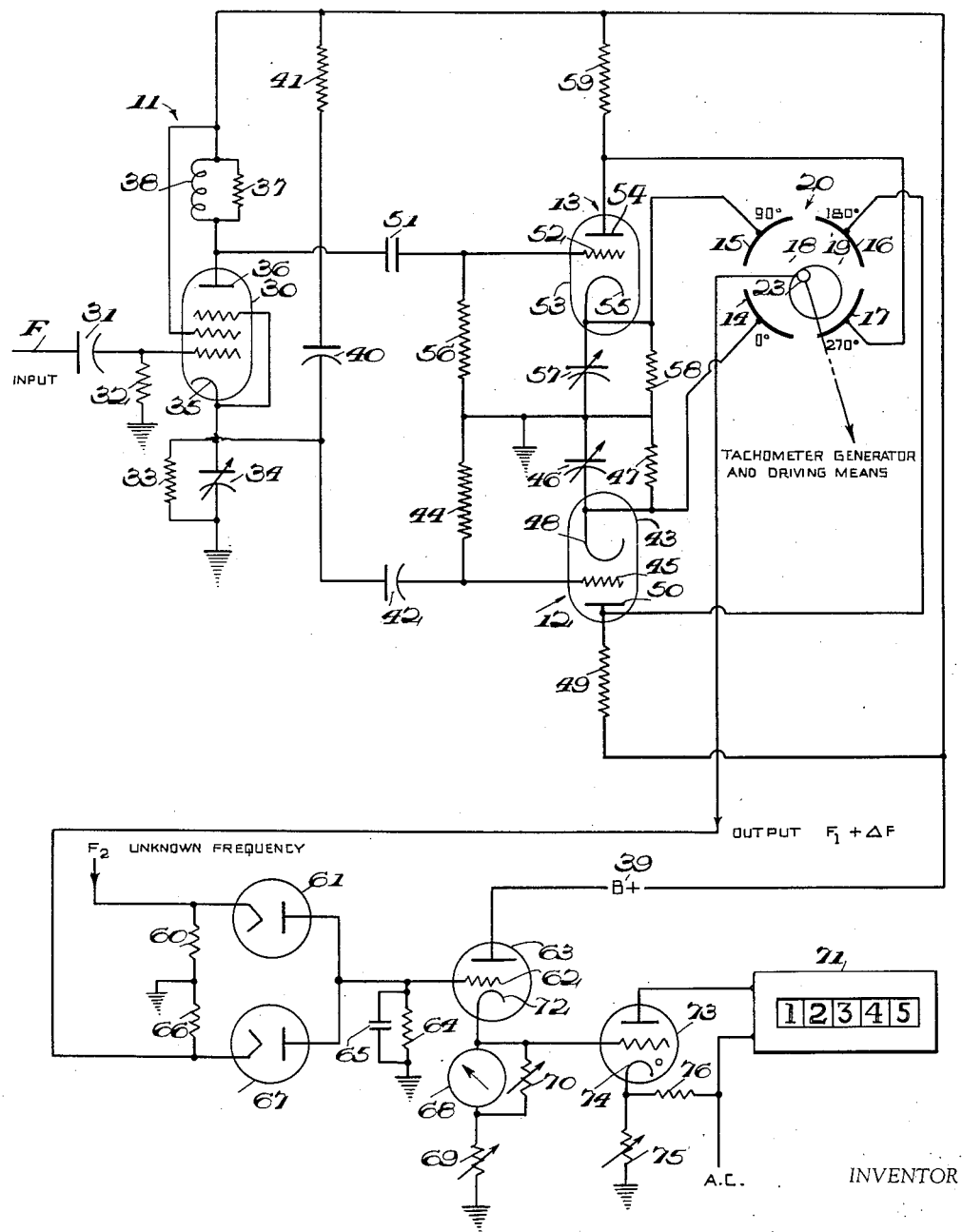

2,777,990
FREQUENCY MEASURING CIRCUIT

Charles L. Hastings, Burlington, N. C., assignor to Western Electric Company, Incorporated, New York, N. Y., a corporation of New York Application November 9, 1951, Serial No. 255,627

4 Claims. (Cl. 324—79)

This invention relates to electrical measuring systems and more particularly to a system for determining the frequency of an unknown source by comparison with the output of a precision standard signal generator.

The principal object of the invention is to accurately measure the frequency of an unknown signal by comparison with a reference signal by varying the latter signal from the standard over a limited range without in any way altering the standard source.

One of the fundamental problems in the measurement of frequencies is the determination of the magnitude and direction of deviation of the unknown frequency from the reference standard. The present practice involves either shifting the standard oscillator frequency, in which case it is no longer a standard, or the use of an auxiliary calibrated oscillator which is checked against a fixed standard. This method introduces error due to "zeroing" difficulty and mathematical interpolation. Other, more complex systems known to the art are equally unsatisfactory due to the multitude of operations involved.

An additional object of the invention is the use of an electro-mechanical linear phase shifting device adapted to alter the frequency of the reference standard by an amount dependent upon the continuous phase shift of the device.

Another object of the invention is to simplify the calibration of unknown sources of periodic voltage by eliminating the time-consuming mathematical processes of interpolation necessary in present practice which introduce error in the final frequency determination.

A feature of the present invention is the use of a high precision source of alternating voltage such as a crystal controlled oscillator to measure frequencies in a given range by changing the frequency of the output of the fixed source and accurately measuring the magnitude of the change when the altered output of the standard and the unknown are resonant.

Another feature of the invention is the use of an electromechanical phase shifter which is continuously rotated in order to produce a constant phase shift and resultant frequency change.

An additional feature of the invention is the use of continuous driving means and means for measuring the speed of rotation of a phase shifter of the type disclosed in United States Patent No. 2,004,613, thus utilizing the principle of continuous and linear phase shifting to produce an accurately determined frequency change.

In accordance with the present invention, there is provided a precision oscillator of predetermined frequency which provides a signal that is fed to a phase shifting network. The output of the network consists of four signals of the same fixed frequency but timed in phase quadrature. The quadrature signals are fed to the rotary phase shifter which is effectively four variable air condensers with rotors commonly driven and oriented orthogonally. This provides maximum coupling of the various plates at 90° intervals of rotation, and by having plates of proper configuration, a signal will be produced which is of constant amplitude and linear continuous phase shift. This results in a signal of a new frequency equal to the frequency of the reference signal plus the speed and direction of rotation of the phase shifter. This signal is then compared with the unknown, and by adjusting the speed and direction of rotation of the phase shifter, a resonant point can be reached, and the frequency of the unknown accurately determined by the addition of the reference frequency and the speed of the phase shifter.

The nature of the invention will be more fully understood from the following detailed description and by reference to the accompanying drawings, of which:

Fig. 1 is a perspective view of one embodiment of the invention including the driven phase shifter and speed indicating means; and Fig. 2 is a schematic representation of the phase shifting networks, phase shifters and detecting means for frequency comparison.

Referring now to the drawings, wherein like reference numerals indicate like parts, and more particularly to Fig. 1, a signal of known frequency is fed from a stable precision source such as a crystal controlled oscillator to the input terminals 10 of a network 11 which will create two signals at its output, one of which will be in phase with the input signal, and the second of which will have a phase relationship which is at 90° with respect to the input.

The "in phase" signal is fed to a second phase shifting network 12 which produces two voltages of the same frequency as the original signal, one of which is in phase with the precision source, and the second signal has a 180° phase shift with respect to the original signal. The signal output of network 11 which is at a phase angle of 90° with respect to the source is also fed to an additional phasing network 13 which will produce two additional signals of the fundamental frequency, one of which is at a phase angle of 90° with respect to the fundamental source and the second signal is 270° out of phase with the source.

Through the use of these networks, four signals are created, all of which have the same frequency but are phased in the quadrature time sequence of 0°, 90°, 180° and 270°.

The 0° signal is fed to fixed plates 14 of a variable air condenser which is part of a phase shifting apparatus 20. In a like manner, the 90° signal is fed to plates 15, the 180° signal to plates 16, and the 270° signal to plates 17 of the phase shifting apparatus 20. The rotatable plates 18, 19 associated with these stator plates are mounted for rotation on a common shaft 23 in a desired direction and have an electrical contact 21 for delivering the output to terminal 22.

Shaft 23 has a gear 24 attached thereto which is in engagement with a driven gear 25 of a variable speed motor 26. This motor 26 is very stable in operation and is readily adjustable to a desired speed and direction of rotation. The motor drive control is so calibrated to determine the direction of rotation. Another gear 27, also in driving engagement with gear 24, drives a generator type tachometer 28 which will give an accurate measurement of the speed of rotation of the condenser rotors. This tachometer produces a signal proportional to speed which, when impressed on meter 29, is read directly in cycles per second.

The manner in which the phase shifting apparatus 20 operates as a frequency changer is as follows: In the position shown in Fig. 1 rotatable plates 18 have a position of maximum coupling with stator plates 14, the plates having a 0° phase shifted signal thereon. Rotatable plates 19 are at right angles to plates 18 and thus are mid-way between stator plates 15 and plates 17. As these stator plates have signals of 180° phase difference, no signal will be produced on rotatable plates 19 in this position. As the plates 18, 19 are rotated clockwise, maximum coupling will exist between plates 15 and 19 and the signal will have shifted 90° in phase for one quarter revolution of the phase shifting apparatus. Thus, for every revolution of the phase shifting apparatus 20, one electrical cycle will be added and by rotating the apparatus 20 at a constant speed and in the desired direction, the precision frequency $F_1$ introduced at input terminals 10 can be increased or decreased by an incremental frequency $\Delta F$ which is equal to the speed and direction of rotation of the apparatus 20. The direction of rotation determines the polarity of $\Delta F$.

Referring to Fig. 2, the 90° phase shifting network 11 consists of a vacuum tube 30 to which the precision frequency source is coupled through coupling condenser 31 and the grid resistor 32. Automatic grid bias is supplied by a network of a resistor 33 and a variable condenser 34 connected to a cathode 35. An anode 36 has a load connected thereto which consists of a load resistor 37 and an inductance 38. An additional phasing network connects the cathode 35 with an anode supply voltage 39 through a condenser 40 and a resistor 41. A vacuum tube is customarily used to produce a 180° phase shift, but by proper addition of the inductive load 38 in the anode circuit and the capacitance 40 in the cathode circuit, the phase shift is accurately adjusted to 90°.

The signal from the cathode 35 is thence fed through a coupling condenser 42 to a second phase splitting network 12. A vacuum tube 43 is employed to produce the desired 180° phase shift. Resistor 44 connects a control grid 45 to ground, and a variable condenser 46 and a resistor 47 provide an automatic grid biasing circuit of adjustable magnitude which is connected to cathode 48. This cathode is directly coupled to the 0° stator plates 14 of the phase shifting apparatus 20. The anode circuit includes a resistance 49 connected between the anode 50 and the high voltage supply 39. The periodic voltage at the anode 50 has a 180° phase relationship to that of the cathode 48 and is directly coupled to the 180° plates 16 of the phase shifting apparatus 20.

The anode 36 of the 90° network 11 is connected through a condenser 51 to a grid 52 of a vacuum tube 53 serving in the capacity of a 180° phasing network in a manner identical to the tube 43. Resistor 56 provides the grid-ground connection, and a variable condenser 57 and a resistor 58 provide the adjustable biasing means. A resistor 59 provides an anode load and is of the same magnitude of the resistor 49. The voltage on cathode 55 is 90° out of phase with the signal on cathode 48 and is directly coupled to the 90° plates 15 of the phase shifting apparatus 20. The anode signal of tube 53 has a 180° phase relationship with respect to the cathode 55 and a 270° phase relationship to the cathode 48. The anode 54 is directly coupled to the 270° plate 17 of the apparatus 20.

The phase shifting apparatus 20 is shown schematically in Fig. 2 with rotatable plates 18 and 19 combined. The signal output of these plates will have a signal frequency of the input signal $F_1$ plus $\Delta F$ resulting from the speed and direction of rotation of the rotatable plates 18—18.

The ouput of the rotatable plates 18—19 is a variable source of periodic voltage of known frequency and is fed to any comparison means in order to determine the frequency of some unknown signal which is also applied to the comparator. In one embodiment here illustrated, a signal $F_2$ of unknown frequency is applied to a resistor 60, which unknown frequency is rectified by a vacuum tube 61 to create a unilateral pulsating voltage on a resistor 64. This voltage is filtered by a condenser 65 to produce a steady D. C. potential proportional to the magnitude of the A. C. input $F_2$. The calibrating signal of frequency $F_1+\Delta F$ is placed on resistor 66 causing a current to flow in rectifier 67 to charge condenser 65 an incremental amount. Condenser 65 and resistor 64 are of proper magnitude to filter the fundamental frequencies $F_2$ and $F_1$ plus $\Delta F$, and also to apply any beat frequency or difference frequency $F_1$ plus $\Delta F - F_2$ to grid 62 of vacuum tube 63. The beat frequency will be amplified by tube 63 and an indication of this beat frequency will be indicated on meter 68. A resistor 69 is provided for grid bias adjustment and a rheostat 70 is employed as a sensitivity control for the meter 68. Hence, by proper adjustment of rheostat 70, a full scale indication will be present when the two signals are in phase.

To illustrate the operation of the frequency measuring circuit embodying the invention, assume that the voltage of unknown frequency $F_2$ and the output voltage from the rotatable plates 18—18 and 19—19 at a frequency $F_1+\Delta F$ differ by two cycles per second. Assume further that these voltages are of equal amplitude. Under these conditions, the condenser 65 will be charged to a maximum value equal to twice the amplitude of either of the voltages $F_2$ and $F_1+\Delta F$ two times each second.

As stated hereinabove, the condenser 65 is of a proper magnitude to filter the fundamental frequencies $F_2$ and $F_1+\Delta F$. This condenser, in conjunction with the resistor 64, must therefore provide such a time constant that the maximum voltage to which the condenser 65 is charged may leak off to some degree between applications of the maximum values. When such maximum values are applied to the condenser 65 only two times per second, as in the instant illustration, two peaks or beats will be applied to the grid 62 of the cathode follower 63. These two peaks will cause the indicator associated with the meter 68 to pulsate twice per second.

Assume now that the voltages of frequencies $F_2$ and $F_1+\Delta F$ differ substantially, e. g., ten cycles per second. Under this condition, the maximum values of the voltages of frequency $F_2$ and $F_1+\Delta F$ add together and are applied to the condenser 65 to charge the condenser to a peak value ten times each second. Even though a portion of each maximum charge leaks off between applications of the maximum charges to create a series of ten peaks each second, as far as the indicator associated with the meter 68 is concerned, the voltage which will then be applied to the grid 62 of the cathode follower 63 will be effectively a D. C. voltage. Therefore, a steady value will be indicated on the meter 68.

Another situation exists when the unknown frequency $F_2$ equals the known frequency $F_1+\Delta F$. Under this condition, the condenser 65 will be charged to a maximum value a number of times per second equal to the frequency of the voltages applied thereto. With the condenser 65 and resistor 64 of the above-mentioned general values, a practically constant voltage will appear on the grid 62 of the tube 63. The indicator associated with the meter 68 will, therefore, read a steady value at this time. Since the maximum value of the voltage applied to the grid 62 can be anywhere from a value equal to the voltage of frequency $F_2$ or frequency $F_1+\Delta F$ and twice such value, depending upon the phase relation between these voltages, the rheostat 70 can be adjusted to obtain a full scale indication on the meter 68.

In illustrating the operation of the frequency measuring circuit embodying the invention, assume that the voltage of frequency $F_2$ equals the voltage of frequency $F_1+\Delta F$. The indicator associated with the meter 68 will read a steady value. The value of $F_2$ is determined by adding or subtracting, to the known magnitude of frequency $F_1$, the magnitude of $\Delta F$ indicated on the meter 29, depending on the direction of rotation of the plates 18—18 and 19—19. To determine if the meter 68 is reading a steady value because the two frequencies are equal, it is merely necessary to decrease and increase the speed of the rotating plates 18—18 and 19—19 one or two cycles per second.

Under the conditions assumed, the indicator associated with the meter 68 will pulsate for both the increase and the decrease of the speed of the rotating plates, and the operator will know that the steady value that he was reading on the meter 68 existed because frequency $F_2$ equaled frequency $F_1+\Delta F$. If the indicator pulsates for only a decrease in the speed of the rotating plates or only an increase in such speed, the operator will know that the steady value indicated on the meter 68 existed because the two frequencies differed substantially. Hence, with the frequency measuring circuit embodying the invention, a very precise, vernier-like apparatus is provided for measuring unknown frequencies.

When it is desired to use this invention as a constant check of stability of source $F_2$, the variable speed motor is adjusted relative to speed and directon so that $F_2$ is equal to $F_1$ plus $\Delta F$ and then any drift or deviation from the standard $F_1$ plus $\Delta F$ over a period of time will be counted in cycles by a thyratron controlled counter 71. When the two signals are in phase, the voltage of cathode 72 would be sufficient to prevent conduction in a thyratron 73, but if the phase relationship is changed, then this thyratron will be ionized when the voltage of cathode 72 becomes more positive than a thyratron cathode 74 which is maintained at a fixed potential by an adjustable voltage divider 75—76.

Thus the system embodied in this invention can be utilized for measuring unknown frequencies by varying the speed of motor 26 operating in the desired direction and observing a "zero beat" condition on meter 68 and also for a continuous check of frequency stability by adjusting the variable speed motor to a point where $F_2$ is equal to $F_1$ plus $\Delta F$ and recording on the counter 71 any variations or drift of signal $F_2$.

Other applications and embodiments of the invention will be manifest to those skilled in the art and it will be understood that this is merely one illustrative embodiment of the invention.

What is claimed is:

1. An apparatus for measuring the unknown frequency of a voltage comprising a precision source of constant frequency voltage, means for providing voltages in phase quadrature with the frequency of said precision source, four groups of stator condenser plates oriented in two symmetrical pairs, means for feeding said quadrature voltages to said stator condenser plates so that the groups in each oriented pair have voltages 180° out of phase, a first group of rotatable metallic condenser plates positioned with their axis of rotation at the mid-point of the first pair of stator condenser plates, a second group of rotatable metallic condenser plates in quadrature with said first group and with their axis of rotation at the midpoint of said second pair of stator condenser plates, adjustable means for rotating said groups of rotatable metallic condenser plates at a constant speed so that the voltage of said rotatable plates has a frequency equal to the sum of the frequency of said constant frequency source and the speed of rotation of said rotatable plates, a pair of diode tubes each having a cathode and an anode, means to connect the voltage of said rotatable plates to the cathode of a first of said diodes, means to connect the voltage of unknown frequency to the cathode of the second of said diodes, a cathode follower tube having an input electrode, a cathode and an anode, means to connect together the anodes of said diodes and the input electrode of said cathode follower tube, filter means connected to said diode anodes, and means connected to the cathode of said cathode follower tube to indicate the difference between the frequencies of the unknown voltage and the output voltage of said rotatable plates.

2. A system for measuring an unknown frequency of a voltage comprising a first source of predetermined constant frequency voltage, means to derive four voltages in phase quadrature from said first source of voltage, a phase condenser having four sets of fixed plates orthogonally positioned electrically and a fifth set of rotatable plates which are common plates to the said four sets of plates and from which an output voltage is taken, means to apply said four quadrature voltages to said four sets of condenser plates, means to rotate said fifth set of plates at variable speeds, means to indicate the speed of rotation of said fifth set of plates, an output circuit connected to said fifth set of rotating plates, a comparator circuit, said comparator circuit including two diodes each having a cathode and an anode, said output circuit connected to the cathode of a first of said diodes, said voltage of unknown frequency connected to the cathode of the second of said diodes, a cathode follower tube having an input electrode, a cathode and an anode, means to electrically connect the anodes of said diodes together and to the input electrode of said cathode follower tube, means connected to the anodes of said diodes to filter the voltages appearing at said anodes, said filter means designed to filter the voltage of unknown frequency and the voltage from the output of said fifth set of rotating plates and to pass any voltage of a frequency which is the difference of the frequencies of the unknown voltage and the output voltage of the rotating fifth set of plates, and indicating means connected to the cathode of the said cathode follower tube to indicate the difference between the frequencies of the unknown voltage and the output voltage of the rotating condenser plates.

3. A system to measure the unknown frequency of a voltage comprising a precision source of voltage of known frequency, a first vacuum tube having an input electrode, a cathode, and an anode, means to apply the voltage of known frequency to the input electrode of said first tube, impedance means connected in the anode circuit of said first tube to provide a voltage 90 degrees out of phase with respect to the voltage of known frequency, a second vacuum tube having an input electrode, a cathode and an anode, means to connect the anode of said first tube to the input electrode of said second tube, first resistance means connected in the anode circuit of said second tube to provide at the anode of said second tube a voltage 270 degrees out of phase with respect to the voltage of known frequency, a third vacuum tube having an input electrode, a cathode, and an anode, means to connect the cathode of said first tube to the input electrode of said third tube, second resistance means connected in the anode circuit of said third tube to provide at the anode of said third tube a voltage 180 degrees out of phase with respect to the voltage of known frequency, a phase condenser having four sets of fixed plates in orthogonal relationship electrically and a fifth set of rotatable plates which are common plates to said four sets of fixed plates, means to connect the cathodes and anodes of said second and third tubes each to one of said four sets of fixed condenser plates, means to rotate said fifth set of plates at constant speeds and to vary the speeds of rotation, means to indicate the speed of rotation of said fifth set of plates, a pair of diode vacuum tubes each having a cathode and an anode, means to electrically connect said fifth set of condenser plates to the cathode of a first of said diodes, means to connect the voltage of unknown frequency to the cathode of the second of said diodes, a cathode follower tube having an input electrode, a cathode, and an anode, means to electrically connect together the anodes of said pair of diodes and said input electrode of said cathode follower tube, a filter condenser connected to the anodes of said diodes, said filter condenser designed to filter frequencies in the order of the fundamental frequencies of the unknown voltage and the voltage of the fifth set of rotating condenser plates but to pass the difference between these frequencies, and indicating means connected to the cathode of said cathode follower tube to indicate the frequency difference between the voltage of unknown frequency and the voltage of the fifth set of rotating condenser plates.

4. A system for measuring the unknown frequency of a voltage comprising a source of voltage of known frequency, means for dividing said source of voltage into two portions having a phase relationship of 90 degrees, means for obtaining from each of said portions a pair of potentials which have a phase relationship of 180 degrees, a phase condenser having four fixed sets of plates positioned in orthogonal relationship electrically and a fifth set of rotating plates which are common plates to said four fixed sets of plates, means for applying said potentials in a progressive phase relationship successively to said four fixed sets of plates of said phase condenser, means to rotate the fifth set of plates of said phase condenser, means to indicate the speed of rotation of said fifth set of plates, a pair of diode vacuum tubes each having a cathode and an anode, means to connect said fifth set of rotating plates to the cathode of a first of said diodes, means to connect the voltage of unknown frequency to the cathode of the second of said diodes, a triode having an input electrode, a cathode, and an anode, means to connect the anodes of said diodes to the input electrode of said triode, filter means connected to the anodes of said diodes to pass only the voltages at frequencies which are in the order of the difference frequencies between the frequency of the voltage of unknown frequency and the frequency of the voltage of the fifth set of rotating plates, and indicating means connected to the cathode of said triode to measure said difference frequency.

References Cited in the file of this patent

UNITED STATES PATENTS

| | | |
|---|---|---|
| 1,885,728 | Keith | Nov. 1, 1932 |
| 2,436,235 | Sunstein | Feb. 17, 1948 |
| 2,436,827 | Richardson et al. | Mar. 2, 1948 |
| 2,443,668 | Tagg | June 22, 1948 |
| 2,451,320 | Clammer | Oct. 12, 1948 |
| 2,454,426 | Beckwith | Nov. 23, 1948 |
| 2,461,832 | Meacham | Feb. 15, 1949 |
| 2,483,311 | Blok | Sept. 27, 1949 |
| 2,491,494 | Grimm | Dec. 20, 1949 |
| 2,492,138 | Earp | Dec. 27, 1949 |